US006685137B2

(12) United States Patent  (10) Patent No.: US 6,685,137 B2
Darbyshire  (45) Date of Patent: Feb. 3, 2004

(54) FLIGHT CONTROL SYSTEM FOR AN AIRCRAFT

(75) Inventor: Ian T. Darbyshire, St. Annes (GB)

(73) Assignee: BAE Systems plc, Farnborough (GB)

( * ) Notice: Subject to any disclaimer, the term of this patent is extended or adjusted under 35 U.S.C. 154(b) by 0 days.

(21) Appl. No.: 09/804,469

(22) Filed: Mar. 13, 2001

(65) Prior Publication Data
US 2001/0028018 A1 Oct. 11, 2001

Related U.S. Application Data

(63) Continuation of application No. PCT/GB01/00292, filed on Jan. 25, 2001.

(30) Foreign Application Priority Data

Mar. 16, 2000 (GB) .............................................. 0006420

(51) Int. Cl.[7] .............................................. B64C 17/04
(52) U.S. Cl. ........................... 244/75 R; 244/93; 244/80
(58) Field of Search ........................... 244/218, 93, 80, 244/75 R, 90 R, 46, 3.26, 49, 3.29, 39

(56) References Cited

U.S. PATENT DOCUMENTS

| 1,853,082 | A | * | 4/1932 | Powelson et al. .............. 244/93 |
| 1,853,233 | A | * | 4/1932 | Schwarz ....................... 244/93 |
| 2,823,880 | A | * | 2/1958 | Bergeson ...................... 137/98 |
| 3,765,622 | A | * | 10/1973 | Haines ..................... 244/17.11 |
| 3,985,320 | A | * | 10/1976 | Brady .......................... 244/93 |
| 4,212,441 | A | * | 7/1980 | Ascani et al. .................. 244/46 |
| 4,735,381 | A |   | 4/1988 | Wood |
| 4,955,962 | A | * | 9/1990 | Mell .......................... 137/263 |
| 4,974,499 | A | * | 12/1990 | Sanderson et al. ............. 89/1.4 |
| 5,020,740 | A |   | 6/1991 | Thomas |
| 5,031,857 | A | * | 7/1991 | MacConochie et al. ...... 244/172 |
| 5,253,827 | A | * | 10/1993 | Funk et al. ...................... 124/1 |
| 5,255,876 | A | * | 10/1993 | Fleming ....................... 16/362 |
| 5,312,070 | A | * | 5/1994 | Arena .......................... 244/46 |
| 5,620,303 | A | * | 4/1997 | Moffitt et al. ................. 416/87 |
| 5,645,250 | A | * | 7/1997 | Gevers ........................ 244/101 |
| 5,671,898 | A |   | 9/1997 | Brown |
| 5,984,231 | A | * | 11/1999 | Gerhardt et al. ............... 244/46 |

FOREIGN PATENT DOCUMENTS

| DE | 748739 | 11/1944 | |
| DE | 297 09 553 | 11/1997 | |
| FR | 1414019 | 9/1965 | |
| GB | 651436 | 4/1951 | |
| GB | 942681 | 11/1963 | |
| GB | 2 261 203 | 5/1993 | |
| GB | 2270510 A | * 3/1994 | ........... B64C/29/00 |

* cited by examiner

Primary Examiner—Peter M. Poon
Assistant Examiner—Tim D. Collins
(74) Attorney, Agent, or Firm—Nixon & Vanderhye P.C.

(57) ABSTRACT

The invention provides an aircraft having a flight control system (20) comprising an aerodynamic lift generator, and a control system in use the lift provided by the lift generator. The lift control system in one embodiment uses a concentrated mass mounted within a longitudinal body of the aircraft, the concentrated mass comprising at least one existing aircraft function and/or system mounted on a support in a confined area. Bearings permit relative movement between the support for the concentrated mass and at least a portion of the lift generator. An actuator is provided for causing such relative movement whereby in use the center of aerodynamic lift and the center of gravity of the aircraft may be moved relative to one another for effecting flight control.

17 Claims, 6 Drawing Sheets

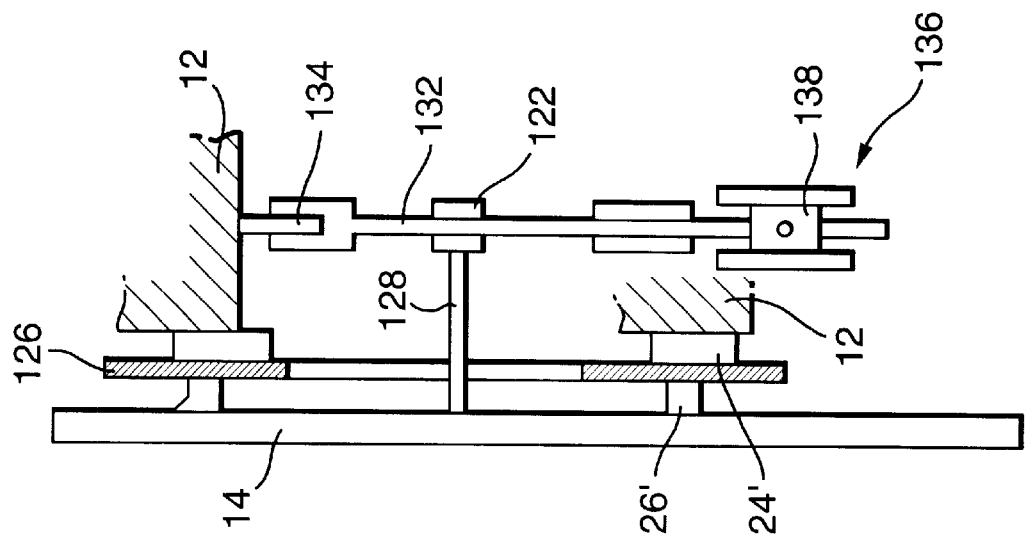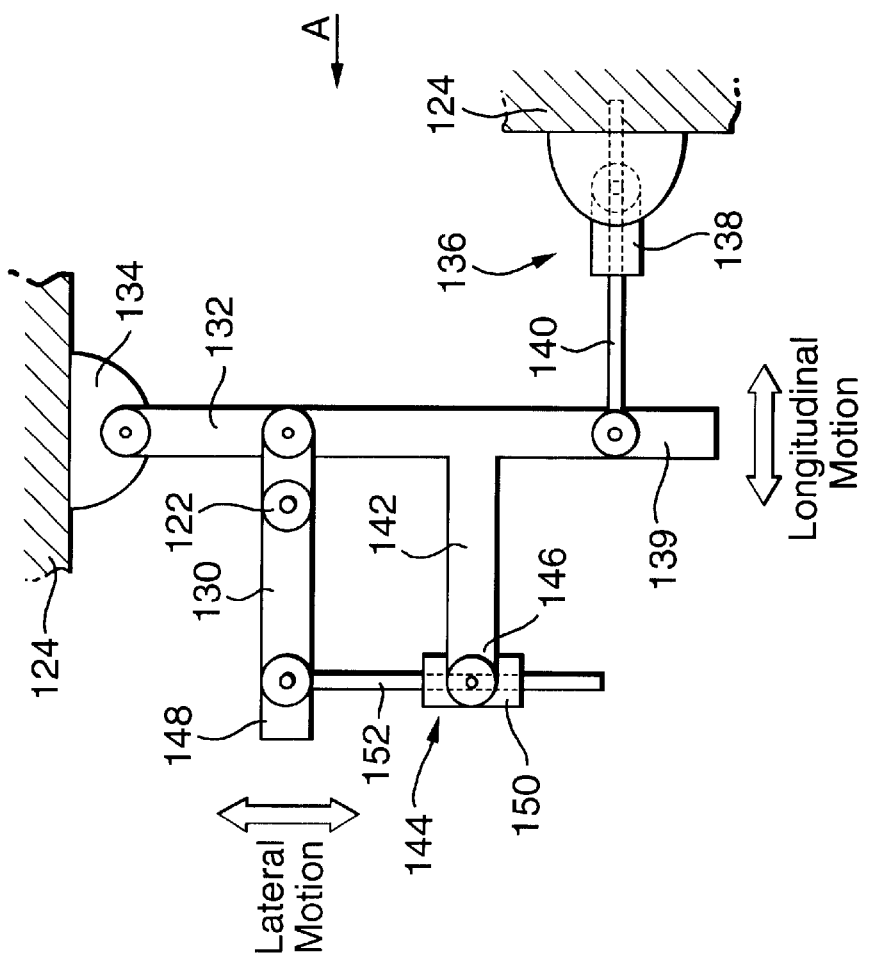

FLIGHT CONTROL SYSTEM FOR AN AIRCRAFT

This is Continuation of Application Ser. No. PCT/GB01/00292 filed Jan. 25, 2001.

BACKGROUND OF THE INVENTION

1. Field of the Invention

This invention concerns a flight control system for an aircraft. The flight control system of the present invention is primarily intended for use in an unmanned aircraft, but it is also suitable for use in a manned aircraft.

2. Discussion of Prior Art

Conventionally, flight control in an aircraft has been achieved by way of aerodynamic control surfaces, for example the ailerons, the flaperons, the elevators, the spoilers and the rudder, attached to the aerodynamic lift generating surfaces of the aircraft. As the inherent airframe instability of present day aircraft and air speeds have increased, the actuation forces needed to move these aerodynamic control surfaces have greatly increased, and the dynamic response requirements of the control surfaces have likewise increased.

Most aircraft currently employ hydraulic actuators for operating the aerodynamic control surfaces, such actuators being capable of producing high forces within relatively confined spaces.

However, hydraulic actuation systems suffer from a number of significant drawbacks, in particular their weight and their need for a high level of maintenance in order to minimise wear and tear and ensure reliability. Further, in order to meet safety regulations such actuators often have to have capabilities well in excess of the normal requirements of the aircraft. For example, safety regulations may dictate that an actuator have twice the necessary thrust capability that is actually required in normal use of the aircraft. All of this adds to the design complexities and expense of such actuator systems.

Electrically powered actuation systems have also been considered and offer certain advantages in terms of weight, life cycle, reliability and maintenance. However, the electrical actuation systems that are currently available are unable to meet the high power transmission requirements and other demands of present day aircraft primary flight control systems.

SUMMARY OF THE INVENTION

It is an aim of the present invention to provide a flight control system for an aircraft, which reduces the control forces and power demands needed for aircraft flight control.

Another aim of the present invention is to provide a flight control system for an aircraft, which avoids the need for complex, high power actuator transmission systems.

The present invention provides an aircraft having a flight control system comprising aerodynamic lift generating means, and means for controlling in use the lift provided by the lift generating means, the lift control means comprising:
a concentrated mass mounted within a longitudinal body of the aircraft, the concentrated mass comprising at least one existing aircraft function and/or system mounted on a support in a confined area,
bearings, permitting relative movement between the support for the concentrated mass and at least a portion of the lift generating means, and
actuation means for causing such relative movement whereby in use the centre of aerodynamic lift and the centre of gravity of the aircraft may be moved relative to one another for effecting flight control.

In a preferred embodiment of the invention described below, the concentrated mass is movable relative to the centre of lift of the aircraft. It is also possible for the concentrated mass to be movable relative to the thrust line of the or a respective aircraft engine.

In a preferred form of the invention described below, the flight control system has at least one concentrated mass mounted within the aircraft body, and the or each mass is movable in two perpendicular directions respectively relative to the aircraft body. For example, the or each concentrated mass may be movable respectively laterally and longitudinally of the aircraft body.

An advantage of this embodiment of the present invention is that the concentrated mass is movable, and entirely located, within the aircraft body in use and therefore there need be no external moving control surfaces, which has stealth benefits.

Further, by the use of low friction bearings, relatively low actuation forces can be employed for moving the concentrated mass, in comparison with the force requirements in a conventional flight control system. As a result, it is envisaged that low power actuation means may be employed, which opens the way to the use of electrical actuators. Existing low power electrical actuators are generally able either to provide a high force or to act at a high rate but not both, and so such actuators have not hitherto been employed in flight control systems. However, the nature and location of the concentrated mass according to the present invention enables linear electrical actuators to be employed with consequent advantages of ease of installation and maintenance, reliability, efficiency and economy.

In an alternative embodiment, the or a portion of the aerodynamic lift generating means is movable relative to the body of the aircraft. For example, a wing or wings of the aircraft may be shiftable relative to the body.

Such an arrangement may have the advantage of simplicity over an arrangement involving movement of a concentrated mass within the interior of the aircraft frame given the complex structuring of such interior space with its need to accommodate various aircraft systems, stores, fuel, engine, etc.

It is envisaged that the concentrated mass may comprise at least one of: the aircraft actuation system, the aircraft fuel tanks and the aircraft storage containers close packed together in a confined space.

According to a further aspect of the invention, there is provided a method of flight control in an aircraft having aerodynamic lift generating means by controlling in use the lift provided by the lift generating means, said lift control comprising:
providing a concentrated mass mounted within a longitudinal body of the aircraft, the concentrated mass comprising at least one existing aircraft function and/or system mounted on a support in a confined area, and
effecting relative movement between the concentrated mass and at least a portion of the aerodynamic lift generating means whereby to shift the centre of gravity and the centre of aerodynamic lift of the aircraft relative to one another for generating lift controlling moments about said centre of gravity.

According to another aspect of the present invention, the aircraft may in addition to or instead of the flight control system mentioned above employ wing area control for flight control purposes.

According to this aspect of the invention, an aircraft has a pair of wings, each having a variable wing area.

In a preferred form of this aspect of the invention described below, each wing comprises a first wing portion which is fixed relative to the body of the aircraft, a second wing portion which is mounted to the first wing portion by means of bearings so as to be extendable and retractable thereto, and actuation means for extending and retracting the second wing portion.

Preferably, the second wing portion is telescopically received within the first wing portion.

An advantage of this aspect of the invention is that the wing area can be adjusted before and/or during flight to control the lift of the aircraft and to suit particular flight conditions.

For example, a larger wing area can be employed for take-off and for high altitude loiter, whereas a smaller wing area can be employed for low altitude high speed flight or for flying in turbulent weather conditions in order to enhance flight control.

According to a further aspect of the invention, there is provided a method of flight control in an aircraft having wings comprising: varying the wing area for at least one of the wings for controlling the lift provided by the wing.

BRIEF DESCRIPTION OF THE DRAWINGS

The invention is described further, by way of example with reference to the accompanying drawings, in which:

FIGS. 10 and 11 are respectively a fragmentary plan view and a corresponding cross sectional view along arrow A showing portions of a second embodiment of the flight control system of the present invention;

DETAILED DISCUSSION OF EMBODIMENTS

Figure 1:
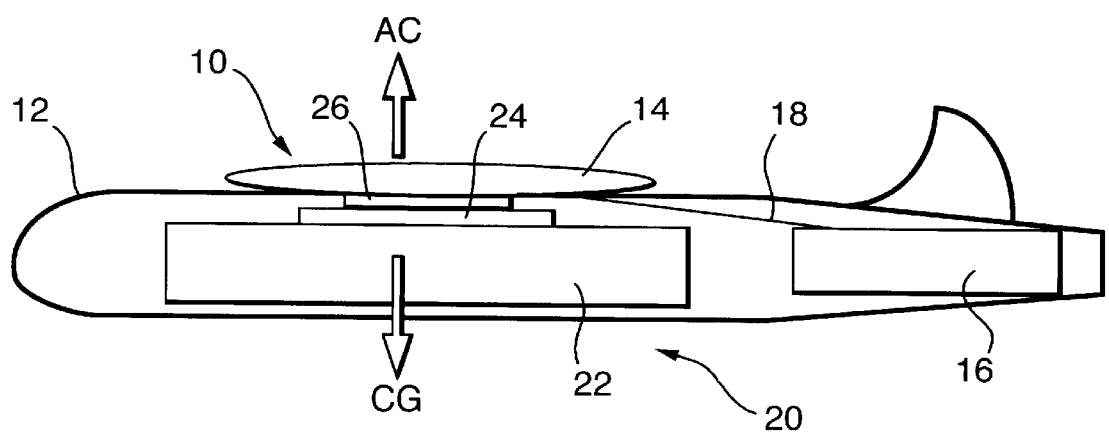
FIG. 1 is a schematic longitudinal section through an aircraft having a flight control system according to the present invention.
Figure 2:
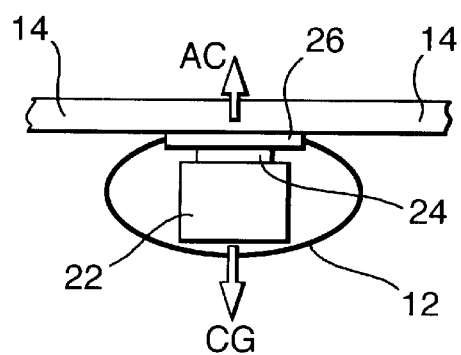
FIG. 2 is a schematic cross section through the aircraft illustrating the flight control system.
Figure 3:
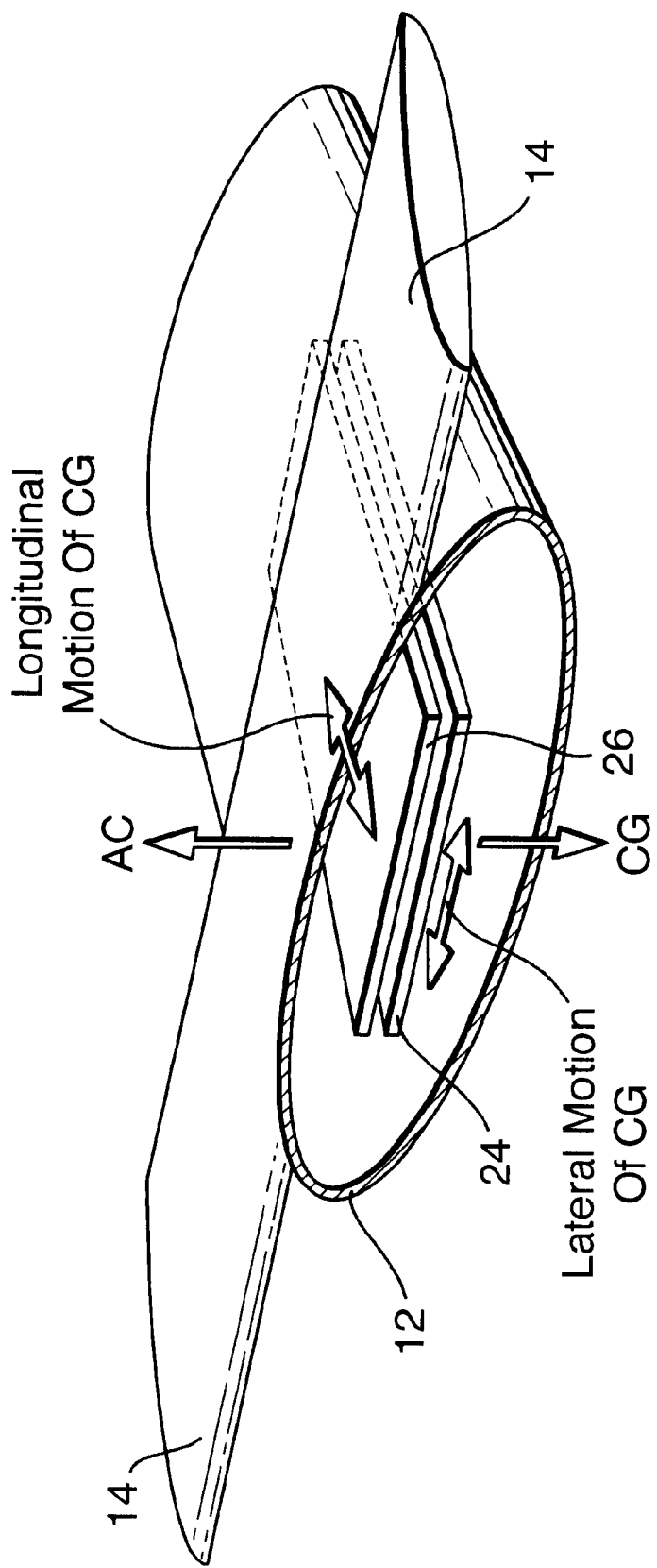
FIG. 3 is a fragmentary perspective view of the aircraft showing linear bearings of the flight control system of the present invention.

Referring initially to FIGS. 1 to 3, these show an aircraft 10 having a body 12 and a single wing extending right across the body 12 to provide on both sides of the body 12 respective wing elements 14. In the present example, the aircraft is an unmanned aircraft powered by a single engine 16 at the rear which is linked to an electrical power supply by way of an electrical power connection 18 shown schematically in FIG. 1.

According to the invention, the aircraft 10 also comprises a flight control system 20. The flight control system 20 comprises a concentrated mass 22, which is mounted within the body 12 of the aircraft 10. The concentrated mass 22 comprises one or more of the existing aircraft functions and/or systems, in the present instance consisting of the bulk of the aircraft actuation system, the aircraft fuel tanks, and any stores required on board, all mounted together in a confined space. The flight control system 20 also includes pair of bearings 24, 26 effectively permitting relative movement between the concentrated mass 22 and the wing elements 14. Each of the bearings 24, 26 is a low friction linear bearing permitting movement of the mass 22 and/or of the wing elements 14 in the lateral direction and the longitudinal direction respectively relative to the aircraft body 12 and hence relative to one another.

FIG. 3 shows the two bearings 24, 26 schematically together with their directions of movement, and demonstrates how, with the aid of these bearings, the concentrated mass 22 and the wing elements 14 can be moved relative to one another in use. By means of relative lateral movement with the aid of the bearings 24, the centre of gravity CG of the aircraft can be shifted laterally in relation to the centre of lift AC to create a rolling moment, and in this way rolling of the aircraft can be controlled. By means of relative longitudinal movement with the aid of the bearings 26, the centre of gravity CG of the aircraft can be shifted longitudinally in relation to the centre of lift AC to create a pitching moment, and hence pitching of the aircraft can be controlled. In this way, such relative movement can be employed to effect flight control.

Figure 4:
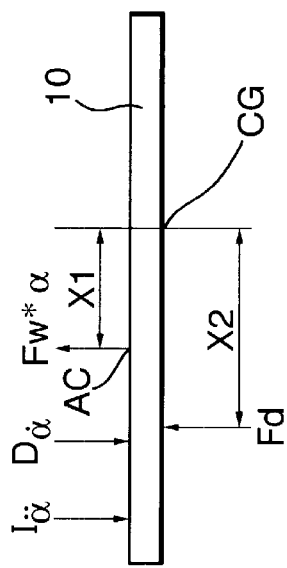
FIG. 4 is a diagrammatic mathematical representation of the aircraft in flight.

FIG. 4 shows in simplified form a dynamic mathematical representation of the flight control system 20. As shown in FIG. 4, the aircraft 10 is represented as a simple beam, which is subjected to an external disturbance Fd representing the aerodynamic forces on the aircraft in flight. The wing lift force Fw acting at the centre of lift AC may then be represented by the following equation:

$$Fw = \tfrac{1}{2} * \rho * V^{**}2 * A * Cl \tag{1}$$

where

ρ = air density
V = aircraft velocity
A = wing area
Cl = lift co-efficient.

The wing lift force Fw and the disturbance force Fd are related by the following equation:

$$I\ddot{\alpha} + D\dot{\alpha} = Fw * \alpha * X1 + Fd * X2 \tag{2}$$

where

I = pitch inertia
D = pitch damping
α̈ = pitch acceleration
α̇ = pitch rate
α = incidence
X1 = the distance between the aircraft centre of lift AC and the aircraft centre of gravity CG
X2 = the distance between the location of the applied disturbance force Fd and the aircraft centre of gravity CG.

It will be apparent from the above equation (2) that aircraft flight control can to a significant extent be achieved by displacement of the aircraft centre of lift AC and the aircraft centre of gravity CG relative to one another and hence by adjustment of the distances X1 and/or X2.

Figure 5:
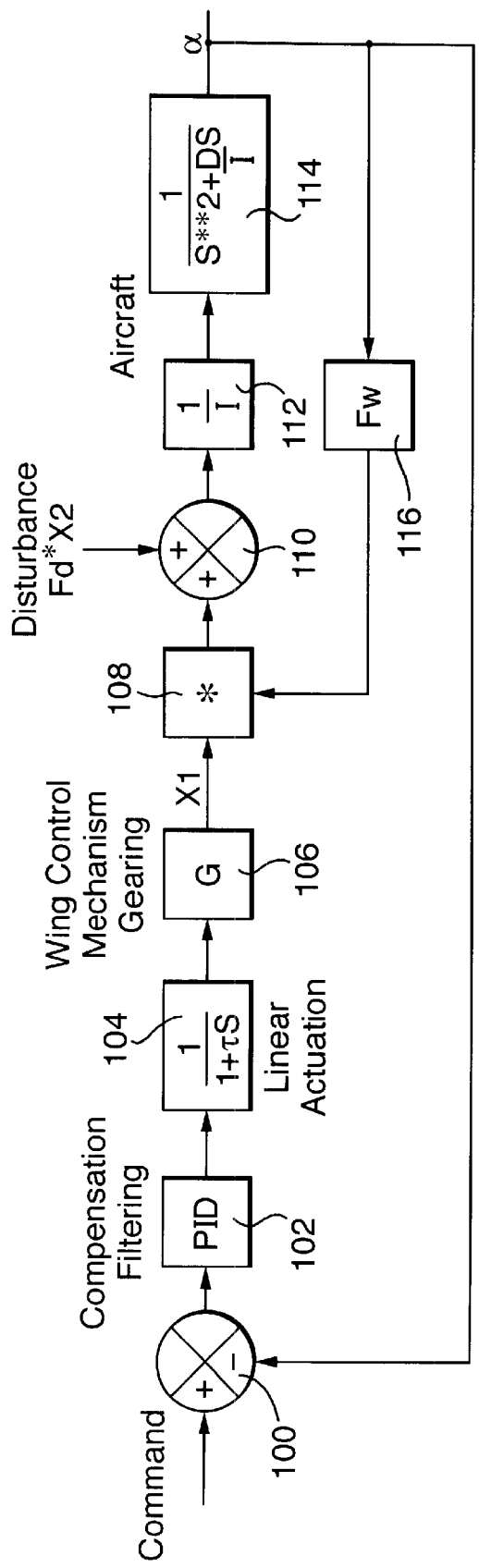
FIG. 5 is a block diagram of the flight control system of the present invention.

Turning to FIG. 5, a schematic block diagram of the control loop for the flight control system 20 for implementing such displacement is shown.

As shown in FIG. 5, a flight control command applied to an input junction 100 is passed through a filtering arrangement 102 for effecting adjustments to the dynamic performance of the overall control loop to achieve a stable control system 20 with the desired dynamic characteristics. The filtering arrangement is implemented in the onboard flight control computer and is here represented as a Laplace Transform of Proportional, Integral and Differential (PID) operations acting on the output of the summing junction 100.

The filtered signal is next applied to a linear actuation arrangement 104 for moving the aircraft wing elements 14 and/or the concentrated mass 22 relative to one another. The actuation arrangement 104 is represented in FIG. 5 as a Laplace Transform of the dynamic characteristics of the actual actuation means for moving the wing elements 14 and/or the mass 22:

$$\frac{1}{1+\tau S}$$

where
S=the Laplace operator
τ=a time constant

The linear actuation arrangement 104 combines with control mechanism gearing 106 to move whichever part is being displaced, namely the wing elements 14 and/or the mass 22, here designated 108, to alter the distance X1 between the centre of lift AC and the centre of gravity CG. The gearing 106 has a gain factor G representing the mechanical advantage of the actuation mechanism. Referring back to FIG. 4, block 108 and a series of following blocks 110, 112, 114, 116 effectively represent what happens when the disturbance Fd creates a moment Fd*X2 on the aircraft, which changes the aircraft incidence. The wing lift force Fw then also changes to produce a corrective moment Fd*X1 on the aircraft. Thus, a highly dynamic situation is created, in which the forces and moments on the aircraft are changing while the distance X1 is also changing due to the movement of the part 108.

The movement of the part 108 and the moment of the disturbance force Fd about the centre of gravity CG are represented as being combined in a summing arrangement 110 to adjust the flight of the aircraft, as discussed above, taking inertial dynamic characteristics 112 and aerodynamic characteristics 114 into account. The angle of incidence α is then fed back to the input 100 directly as a negative feedback to stabilise the aircraft flight and, in addition, the angle of incidence α is applied through a computation arrangement 116 representing wing lift force Fw as another input for determining movement of the part 108 according to the product Fw*X1.

Figure 6:
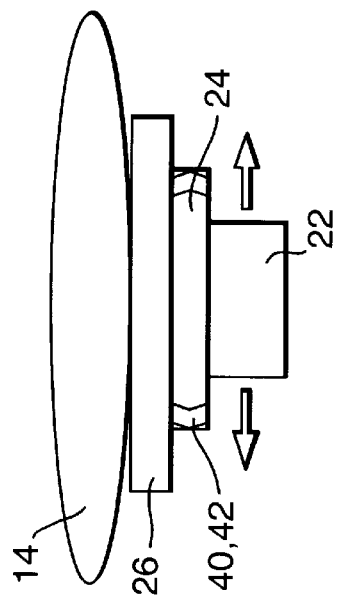
FIGS. 6 and 7 are respectively a cross-section through the aircraft body showing portions of a first embodiment of the present flight control system, and a corresponding plan view.

Turning to FIGS. 6 to 9, further details of one embodiment of the flight control system in which the concentrated mass 22 is movable within the aircraft body 12 on the bearings 24, 26 are illustrated. FIG. 6 shows how the longitudinal bearing 26 is mounted within the aircraft body 12 to permit movement of the mass 22 longitudinally of the aircraft 10. The longitudinal bearing 26 comprises a pair of linear bearing tracks 28 provided on a fixed platform (not shown) beneath the aircraft wing elements 14 and arranged to extend longitudinally of the aircraft body 12. The tracks 28 engage corresponding bearing surfaces 30 on a mounting plate 32 situated between the two tracks 28. The bearing surfaces 28, 30 may comprise teflon bearings, roller bearings, ball bearings or other means providing low friction linear bearings.

Figure 7:
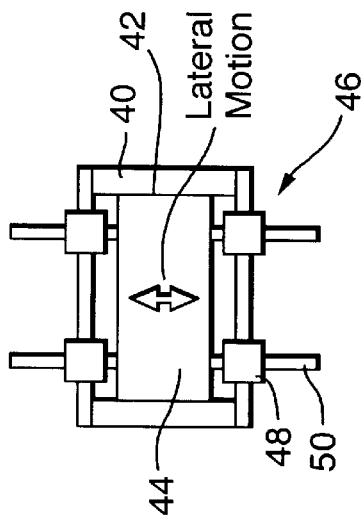

The plate 32 is thus movable longitudinally of the aircraft body 12 on the low friction linear bearings 28, 30 and movement of the plate 32 is controlled by a plurality of actuation means 34. As shown in FIG. 7, each actuation means comprises a direct thrust linear electric actuator 36 having a thrust shaft 38 in direct engagement with the plate 32.

Figure 8:
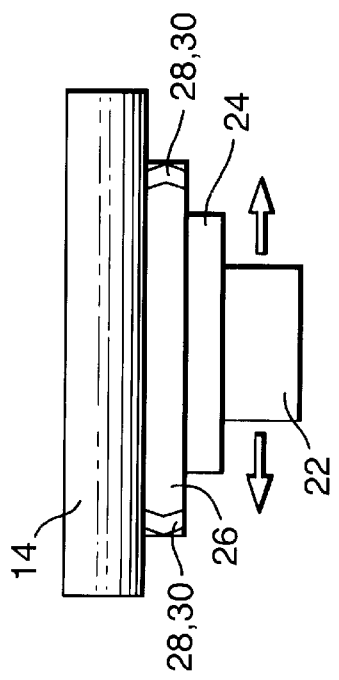
FIGS. 8 and 9 are respectively a longitudinal section through the aircraft body showing further portions of the first embodiment of the flight control system of the present invention, and a corresponding plan view.
Figure 9:
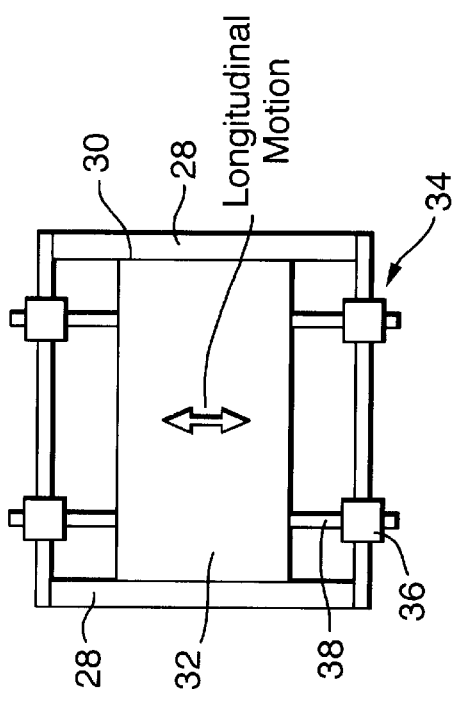

Suspended from the plate 32 and carried thereby are firstly the lateral bearings 24, and secondly the concentrated mass 22. Details of the lateral bearings 24 are shown in FIGS. 8 and 9.

As shown in these Figures, the lateral bearings 24 again comprise a pair of linear bearing surfaces 40 this time provided on the plate 32 and arranged to extend laterally of the aircraft body 12. The lateral bearings 24 are engaged by a corresponding pair of bearing surfaces 42 on a support plate 44. As before, the bearing surfaces 40, 42 may comprise teflon bearings, roller bearings, ball bearings or other low friction linear bearings.

The plate 44 is thus enabled to move laterally of the aircraft body 12, and movement of the plate 44 is controlled by way of a plurality of actuation means 46. As shown, each actuation means 46 comprises a direct thrust a linear electric actuator 48 having a thrust shaft 50 in direct contact with the plate 44. The plate 44 carries the concentrated mass 22, and hence movement of both the plate 44 and the concentrated mass 22 is controlled by way of the linear electric actuators 48.

It will be apparent that precise control of the position of the concentrated mass 22 relative to the aircraft centre of lift AC, and of the movement of the concentrated mass 22 within the aircraft body 12, can be achieved by appropriate control of the linear electric actuators 36, 48. Relatively small adjustments of the centre of gravity CG of the aircraft 10 in this way can be employed to create relatively large pitch and roll movements of, and also considerable angular acceleration rates for, the aircraft as a whole. Hence, relatively low control forces can be used to obtain the necessary flight control characteristics.

As a result, it is envisaged that the necessary control forces are likely to be within the capabilities of existing linear actuators. Consequently, the bulky gear boxes and pumps to be found in conventional hydraulic actuators can be eliminated and an increase in overall vehicle reliability can be expected. Such actuators also have significant advantages in terms of maintainability and life cycle.

Turning now to FIGS. 10 and 11, a second embodiment of the flight control system, in which the wing elements 14 are movable on the aircraft body 12 on bearings 24', 26' is shown. FIG. 10 is a plan view of the drive mechanism, shown as block 106 in FIG. 5, provided between a wing drive spigot 122 connected to the wing elements 14, and portions 124 of the aircraft body 12. FIG. 11 shows how the wing elements 14 are mounted by way of the bearings 24', 26' on the aircraft body 12, and demonstrates the connection of the drive spigot 122 with the drive mechanism 106.

Referring first to FIG. 11, it will be seen that the longitudinal bearing 26' permits longitudinal movement of the wing elements 14 relative to a plate 126 carried by the aircraft body 12. The plate 126 is mounted on the aircraft body 12 by way of the lateral bearings 24' and hence is movable laterally of the aircraft body 12. The bearings 24', 26' may comprise teflon bearings, roller bearings, ball bearings or other means providing low friction linear bearings. As a result of this arrangement, the wing elements 14 are movable both longitudinally and laterally relative to the aircraft body 12.

This movement of the wing elements 14 is controlled by way of a control rod 128 connected to the wing drive spigot 122. The spigot 122 is pivotably connected to a first drive bar 130, which in turn is pivotably connected to a second drive bar 132 mounted by a pivot connection 134 to one of the structural portions 124 of the body 12. Actuation means 136 pivotably connected between another portion 124 of the aircraft body 12 and a remote end 139 of the second drive bar 132 serve to control movement of the drive spigot 122 in the longitudinal direction of the aircraft. The actuation means 136 comprises a direct thrust linear electric actuator 138 having a thrust shaft 140 pivotably connected to the drive bar 132.

The second drive bar 132 has a perpendicular extension 142, and further actuation means 144 are pivotably mounted between a free end 146 of the extension 142 and a free end 148 of the first drive bar 130. The actuation means 144 comprises a direct thrust linear electric actuator 150 having a thrust shaft 152. As can be seen, operation of the linear electric actuator 150 has the effect of pivoting the first drive bar 130 in relation to the second drive bar 132 and of moving the drive spigot 122 laterally of the aircraft body 12.

The second embodiment of the invention shown in FIGS. 10 and 11 has the advantage that the bearings 24', 26' are external to the main body 12 of the aircraft and the drive mechanism 106 can be located within the body 12 immediately under the wing elements 14. As a result, the drive mechanism 106 hardly interferes with the design of the interior space of the aircraft body 12, and with the arrangement of the various aircraft systems, stores and fuel supplies.

Figure 12:
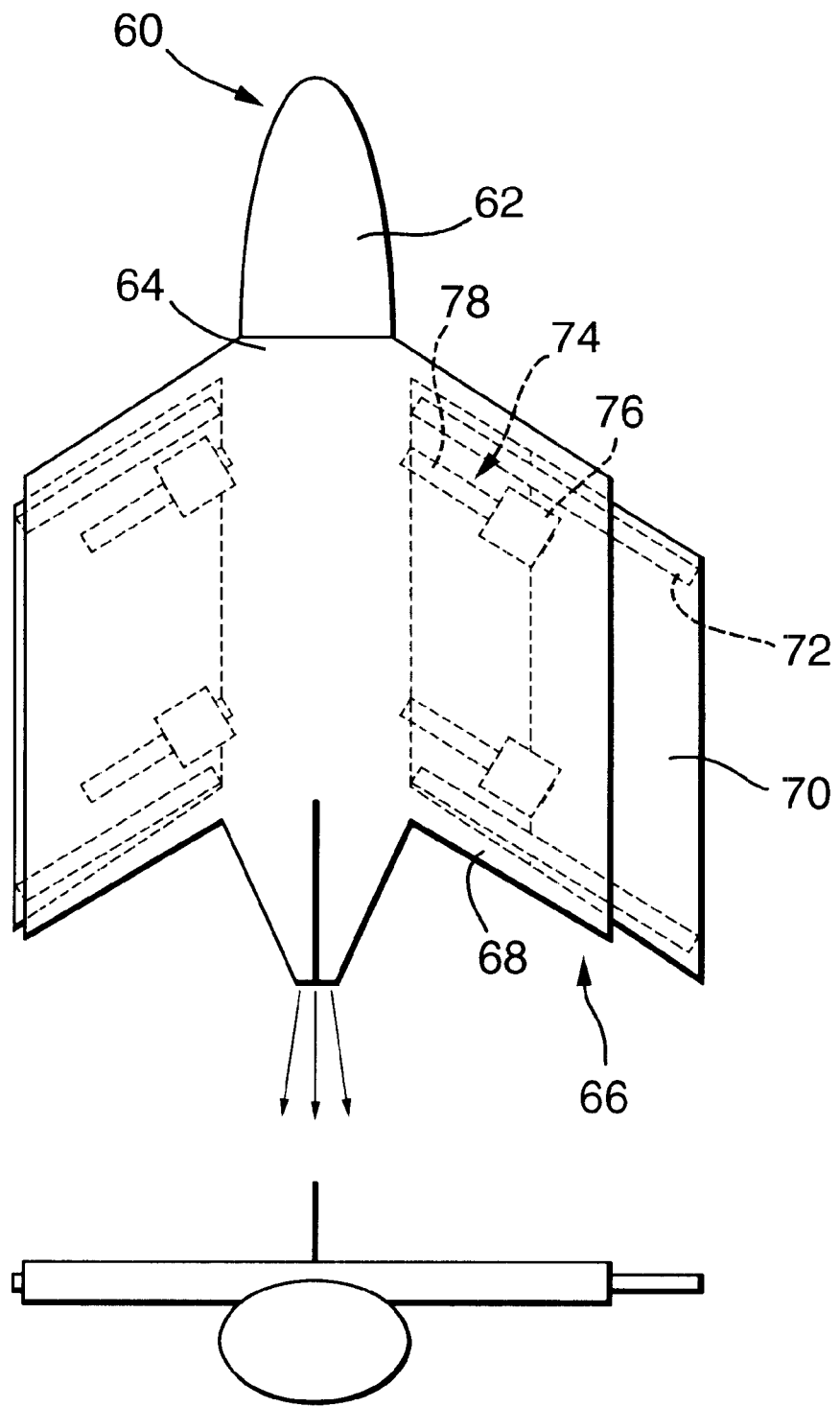
FIG. 12 is a schematic plan view of an aircraft having a pair of wings each with a variable wing area.

Turning now to FIG. 12, a further aspect of the flight control system of the present invention is shown. In this aspect, an aircraft 60 having a body 62 and a pair of wings 64 is provided with an arrangement 66 for varying the wing area of each wing 64. The right hand side of FIG. 12 shows one of the wings 64 having a maximum wing area, while the left hand side of FIG. 12 shows the other of the wings 64 having a minimum wing area.

In order to permit variation of the wing area, each wing 64 comprises a first wing portion 68 which is rigidly fixed to and/or integral with the body 62 of the aircraft 60. A second wing portion 70 is telescopically received within the first wing portion 68 for movement between a fully retracted position (shown on the left hand side of FIG. 8) and a fully extended position (shown on the right hand side of FIG. 8). In practice, the second wing portion 70 may also be moved to any position between the fully retracted position and the fully extended position.

Relative movement of the second wing portion 70 and the first wing portion 68 is possible by virtue of the fact that the second wing portion is mounted on low friction linear bearings 72 within the first wing portion 69. These low friction linear bearings may be teflon bearings, roller bearings, ball bearings or any other low friction bearings.

In addition, a pair of actuation means 74 is associated with each wing 64 for effecting extension and retraction of the second wing portion 70 relative to the first wing portion 68. Each actuation means 74 comprises a direct thrust linear electric actuator 76 having a thrust shaft 78. One of the actuator 76 and the thrust shaft 78 is mounted either on the aircraft body 62 or on the first, fixed, wing portion 68 and the other of the actuator 76 and thrust shaft 78 is mounted on the second, movable, wing portion 70. Because the first wing portion 64 carries the second wing portion 70 by way of low friction bearings, extension and retraction of the second wing portion 70 can readily be effected by operation of the actuation means 74.

A significant advantage of the arrangement shown in FIG. 12 is that the wing area of the aircraft can be adjusted to suit the current flight conditions. For example, the second wing portion 70 may be fully extended to provide a maximum wing area during take off and high altitude loiter. For low altitude high speed flight and in turbulent conditions, the second wing portion 70 may be fully retracted to provide a minimum wing area for enhanced flight control.

Variation of the wing area provides direct lift control for the aircraft and offers the possibility of consistently operating the aircraft at maximum lift/drag ratio in order to achieve maximum fuel efficiency. Thus, it may be possible to increase the range of the aircraft and/or increase the pay-load for the aircraft. By combining the feature of moving the centre of gravity CG of the aircraft relative to the centre of lift AC, as described in relation to FIGS. 1 to 11, and the feature of varying the wing area, as described in relation to FIG. 12, a very high degree of control may be possible even at exceptionally low air speeds.

The described flight control system offers many advantages, not the least of which is the reduction in the required aircraft control forces, and hence in the energy demands on the electrical generation and supply system, due to the fact that the power required for flight control is transmitted from the engine via the airframe and the low friction bearing assembly.

In both of the first and second embodiments of the invention shown respectively in FIGS. 6 to 9 and, in FIGS. 10 and 11, the flight control system stabilises the aircraft by controlling the relationship of its centre of gravity CG relative to its aerodynamic centre or centre of lift AC. The flight control system therefore inherently compensates for variations in the mass of the aircraft due to changes in aircraft stores and fuel states, without the need for the system receiving direct information relating to the stores and fuel states.

A number of modifications are possible within the scope of the invention. For example, although the embodiments described envisage using only a single concentrated mass 22, this could be replaced by a number of such masses situated at different locations within the body 12 of the aircraft. Such masses could be arranged to be independently movable on respective bearings relative to the wing elements 14.

Likewise, although in the embodiment described with reference to FIGS. 6 to 9 the concentrated mass 22 is movable relative to the centre of lift AC of the aircraft, it could also be movable relative to the direction of thrust of the engine 16, or of a respective engine if there are more than one.

Movement of the aircraft centre of gravity CG relative to the aircraft centre of lift AC allows the control and pitch and roll whereas in a similar manner movement of the or another concentrated mass relative to the line of the engine thrust permits control of yaw and roll.

What is claimed is:

1. An aircraft flight control system, said aircraft having a mass and including aerodynamic lift generating means, said flight control system comprising:

a portion of the aircraft mass mounted within the aircraft on a support, bearings permitting relative movement between the support for the portion of aircraft mass and at least a portion of the lift generating means in lateral and longitudinal directions, and actuation means for moving said portion of aircraft mass in lateral and longitudinal directions relative to the centre of aerodynamic lift of the aircraft for effecting flight control of said aircraft.

2. An aircraft flight control system according to claim 1 wherein the bearings comprise linear bearings.

3. An aircraft flight control system according to claim 1 in which at least a portion of the lift generating means is movable relative to the body of the aircraft.

4. An aircraft flight control system according to claim 1 in which the portion of the aircraft mass comprises at least one of an aircraft actuation system, an aircraft fuel tank and an aircraft storage container.

5. An aircraft flight control system according to claim 1 in which the portion of the aircraft mass includes more than one mass element, and in which the bearings permit independent relative movement between each mass element and the lift generating means.

6. An aircraft flight control system according to claim 1 in which the actuation means comprise linear electrical actuators.

7. An aircraft flight control system according to claim 1 in which the aerodynamic lift generating means comprise a pair of wings each having a variable wing area.

8. An aircraft flight control system according to claim 7 in which each wing comprises a first wing portion which is fixed relative to the body of the aircraft, a second wing portion which is mounted to the first wing portion by means of bearings so as to be extendable and retractable relative thereto, and actuation means for extending and retracting the second wing portion.

9. A method of flight control in an aircraft, said aircraft having a mass and including an aerodynamic lift generating means, comprising the Steps of:

mounting a portion of said aircraft mass on a support, mounting said support for movement in lateral and longitudinal directions relative to said lift generating means, and moving the support and the portion of said aircraft mass In said lateral and longitudinal directions relative to the aerodynamic lift generating means for effecting flight control of said aircraft.

10. A method according to claim 9 which the aerodynamic lift generating means comprise a pair of wings, and including the further step of varying the wing area for controlling the lift.

11. An aircraft flight control system, said aircraft having a body and including aerodynamic lift generating means and at least one engine, said engine having a thrust line, said flight control system comprising:

a portion of said lift generating means mounted to the aircraft, bearings permitting relative movement between the aircraft body and said portion of the lift generating means, said movement in lateral and longitudinal directions in a plane substantially parallel to said thrust line, and actuation means for moving said portion of said lift generating means relative to said aircraft body in said lateral and longitudinal directions in said plane for effecting flight control of said aircraft.

12. An aircraft flight control system according to claim 11 wherein the bearings comprise liner bearings.

13. An aircraft flight control system according to claim 11 in which the actuation means comprise linear electrical actuators.

14. An aircraft flight control system according to claim 11 in which the aerodynamic lift generating means comprise a pair of wings each wing having a variable wing area.

15. An aircraft flight control system according to claim 14 in which each wing comprises a first wing portion which is fixed relative to the body of the aircraft, a second wing portion which is mounted to the first wing portion by means of bearings so as to be extendable and retractable relative thereto, and actuation means for extending and retracting the second wing portion.

16. A method of flight control in an aircraft, said aircraft having a body and including an aerodynamic lift generating means and at least one engine, said engine having a thrust line, comprising the steps of:

mounting a portion of said lift generating means to the aircraft body, mounting said portion of said lift generating means for movement in lateral and longitudinal directions in a Diane substantially parallel to said thrust line relative to said aircraft body, and moving the portion of said lift generating means in said lateral and longitudinal directions in said plane relative to said aircraft body.

17. A method according to claim fin which the aerodynamic lift generating means comprise a pair of wings, and including the further step of varying the wing area for controlling the lift.

* * * * *